(12) United States Patent
Maczka et al.

(10) Patent No.: US 10,313,294 B2
(45) Date of Patent: Jun. 4, 2019

(54) PENDING INVITATIONS AT ONBOARDING

(71) Applicant: Microsoft Technology Licensing, LLC, Redmond, WA (US)

(72) Inventors: Michael Maczka, San Jose, CA (US); Joonhyung Lim, San Jose, CA (US); Reza Arbabi, Cupertino, CA (US); Yang Zhou, San Jose, CA (US); Damien Albert Louis Coullon, Mountain View, CA (US); Carrie Zhuqing Peng, San Jose, CA (US); Vivien Sin, San Francisco, CA (US); Ruiyun Zhou, Sunnyvale, CA (US); Tob Siripak, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 370 days.

(21) Appl. No.: 15/334,581

(22) Filed: Oct. 26, 2016

(65) Prior Publication Data

US 2018/0115508 A1 Apr. 26, 2018

(51) Int. Cl.
| | | |
|---|---|---|
| *H04L 12/58* | (2006.01) | |
| *H04L 29/08* | (2006.01) | |
| *H04W 4/14* | (2009.01) | |
| *H04W 4/21* | (2018.01) | |

(52) U.S. Cl.
CPC ............ *H04L 51/32* (2013.01); *H04L 51/066* (2013.01); *H04L 67/306* (2013.01); *H04W 4/14* (2013.01); *H04W 4/21* (2018.02)

(58) Field of Classification Search
CPC ....... H04L 51/32; H04L 51/38; H04L 67/306; H04L 51/066; H04L 51/20; H04W 4/14; H04W 4/21; H04W 4/02; H04W 4/023

USPC .......................................................... 709/206

See application file for complete search history.

(56) References Cited

U.S. PATENT DOCUMENTS

| | | | | |
|---|---|---|---|---|
| 2012/0226749 A1* | 9/2012 | Dale | ..................... | G06Q 50/01 709/204 |
| 2013/0024513 A1* | 1/2013 | Sacks | ..................... | G06Q 10/10 709/204 |
| 2013/0091209 A1* | 4/2013 | Bennett | ................... | H04W 4/21 709/204 |

* cited by examiner

Primary Examiner — Tu T Nguyen
(74) Attorney, Agent, or Firm — Schwegman Lundberg & Woessner, P.A.

(57) ABSTRACT

A system, a machine-readable storage medium storing instructions, and a computer-implemented method are described herein are directed to an Invitation Conversion Engine that generate a first social network invitation for transmission to a first external identifier of a potential member account from a first member account of a social network service. The Invitation Conversion Engine generates a second social network invitation for transmission to the first external identifier of from a second member account. Based on receipt of an acceptance of the second social network invitation, the Invitation Conversion Engine instantiates a new member account associated with the first external identifier. The Invitation Conversion Engine converts the first social network invitation to a first social network connection request from the first member account for the new member account. The Invitation Conversion Engine provides the first social network connection request to the new member account.

20 Claims, 9 Drawing Sheets

PENDING INVITATIONS AT ONBOARDING

TECHNICAL FIELD

The subject matter disclosed herein generally relates to the technical field of special-purpose machines that facilitate conversion of social network invitations to respective social network connection requests, including software-configured computerized variants of such special-purpose machines and improvements to such variants, and to the technologies by which such special-purpose machines become improved compared to other special-purpose machines that facilitate conversion of social network invitations to respective social network connection requests.

BACKGROUND

A social networking service is a computer- or web-based application that enables users to establish links or connections with persons for the purpose of sharing information with one another. Some social networking services aim to enable friends and family to communicate with one another, while others are specifically directed to business users with a goal of enabling the sharing of business information. For purposes of the present disclosure, the terms "social network" and "social networking service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks").

With many social networking services, members are prompted to provide a variety of personal information, which may be displayed in a member's personal web page. Such information is commonly referred to as personal profile information, or simply "profile information", and when shown collectively, it is commonly referred to as a member's profile. For example, with some of the many social networking services in use today, the personal information that is commonly requested and displayed includes a member's age, gender, interests, contact information, home town, address, the name of the member's spouse and/or family members, and so forth. With certain social networking services, such as some business networking services, a member's personal information may include information commonly included in a professional resume or curriculum vitae, such as information about a person's education, employment history, skills, professional organizations, and so on. With some social networking services, a member's profile may be viewable to the public by default, or alternatively, the member may specify that only some portion of the profile is to be public by default. Accordingly, many social networking services serve as a sort of directory of people to be searched and browsed.

DESCRIPTION OF THE DRAWINGS

Some embodiments are illustrated by way of example and not limitation in the figures of the accompanying drawings in which.

DETAILED DESCRIPTION

Figure 1:
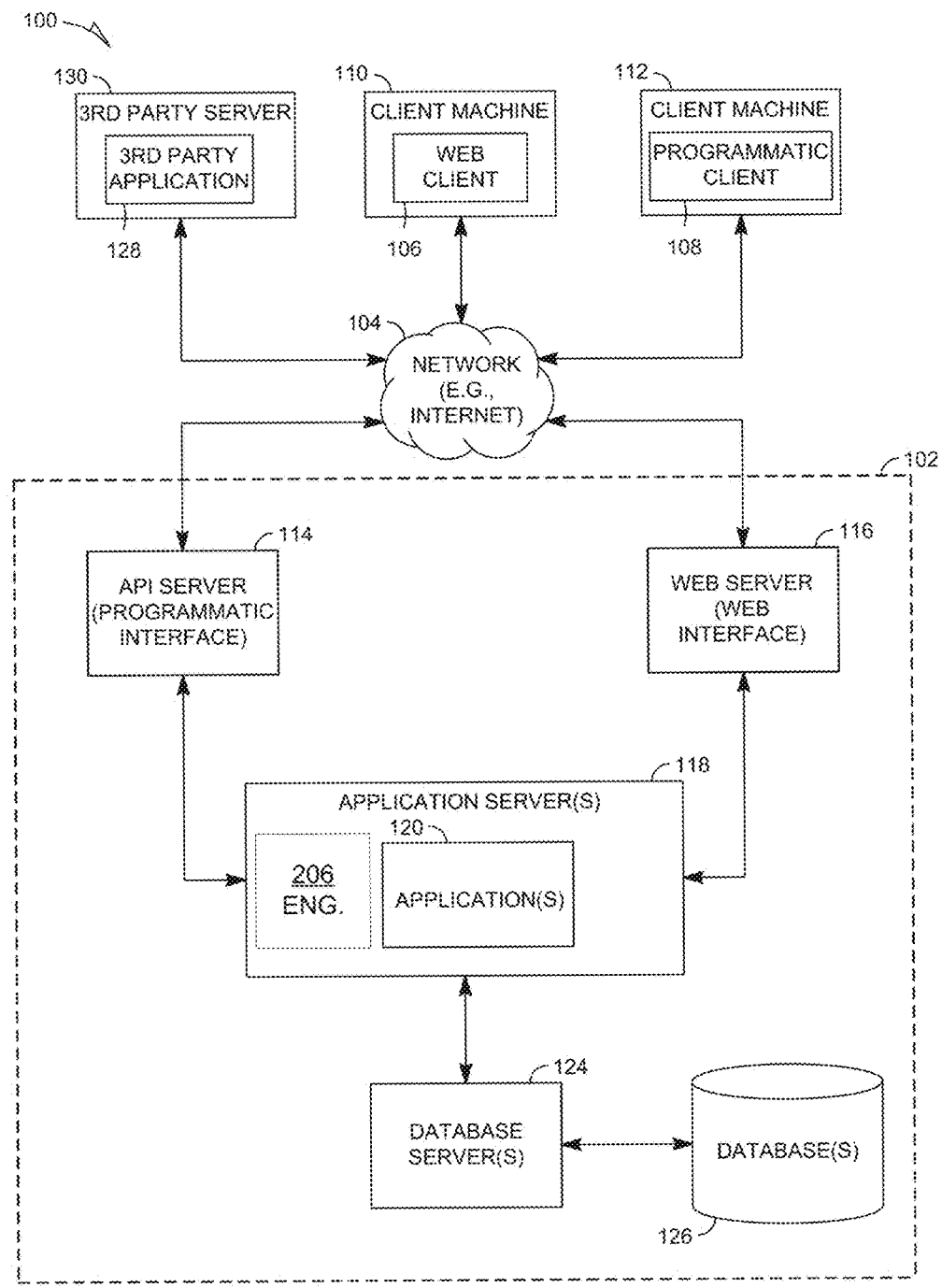
FIG. 1 is a block diagram illustrating a client-server system, in accordance with an example embodiment.

The present disclosure describes methods and systems for updating a target member account in a professional social networking service (also referred to herein as a "professional social network" or "social network") based on a resource accessed by the target member account. In the following description, for purposes of explanation, numerous specific details are set forth in order to provide a thorough understanding of the various aspects of different embodiments of an Invitation Conversion Engine as described herein. It will be evident, however, to one skilled in the art, that the one or more embodiments of the Invitation Conversion Engine may be practiced without all of the specific details.

A system, a machine-readable storage medium storing instructions, and a computer-implemented method are described herein are directed to an Invitation Conversion Engine that generates a first social network invitation for transmission to a first external identifier of a potential member account from a first member account of a social network service. The Invitation Conversion Engine generates a second social network invitation for transmission to the first external identifier of from a second member account. Based on receipt of an acceptance of the second social network invitation, the Invitation Conversion Engine instantiates a new member account associated with the first external identifier. The Invitation Conversion Engine converts the first social network invitation to a first social network connection request from the first member account for the new member account. The Invitation Conversion Engine provides the first social network connection request to the new member account.

According to an example embodiment, multiple member accounts of a social network service send social network invitations to an external email address of a potential member account over a period of time. A potential member account corresponds to an individual who receives the social network invitations at the external email address. Each social network invitation is an invitation to the individual from each respective member account to register a new member account on the social network service. However, only acceptance of one of the social network invitations is required in order to trigger registration of that individual's new member account.

Upon receipt of such acceptance of a particular social network invitation, the Invitation Conversion Engine converts the previously sent social network invitations that were not accepted to social network connection requests from those member accounts who sent the unaccepted invitations. When the new member account is initialized based on the acceptance of the particular invitation, the Invitation Conversion Engine provides the new member account with the social network connection requests that were converted from the previously sent—but ignored—social network invitations. Such conversion of previously sent social network invitations to social network connection requests ensures that the new member account will have an opportunity to immediately establish social network connections with those member accounts that sent the invitations.

It is understood that various embodiments further include encoded instructions that comprise operations to generate a user interface(s) and various user interface elements. The user interface and the various user interface elements can be displayed to be representative of any of the operations, member accounts, social network invitations, social network connection requests, member identifiers, external identifiers, listings and profile data, as described herein. In addition, the user interface and various user interface elements are generated by the Invitation Conversion Engine to cause display of the user interface and various user interface elements on a computing device, a server computing device, a mobile computing device, etc.

Turning now to FIG. 1, FIG. 1 is a block diagram illustrating a client-server system, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102. In some embodiments, the networked system 102 may comprise functional components of a professional social network.

Figure 2:
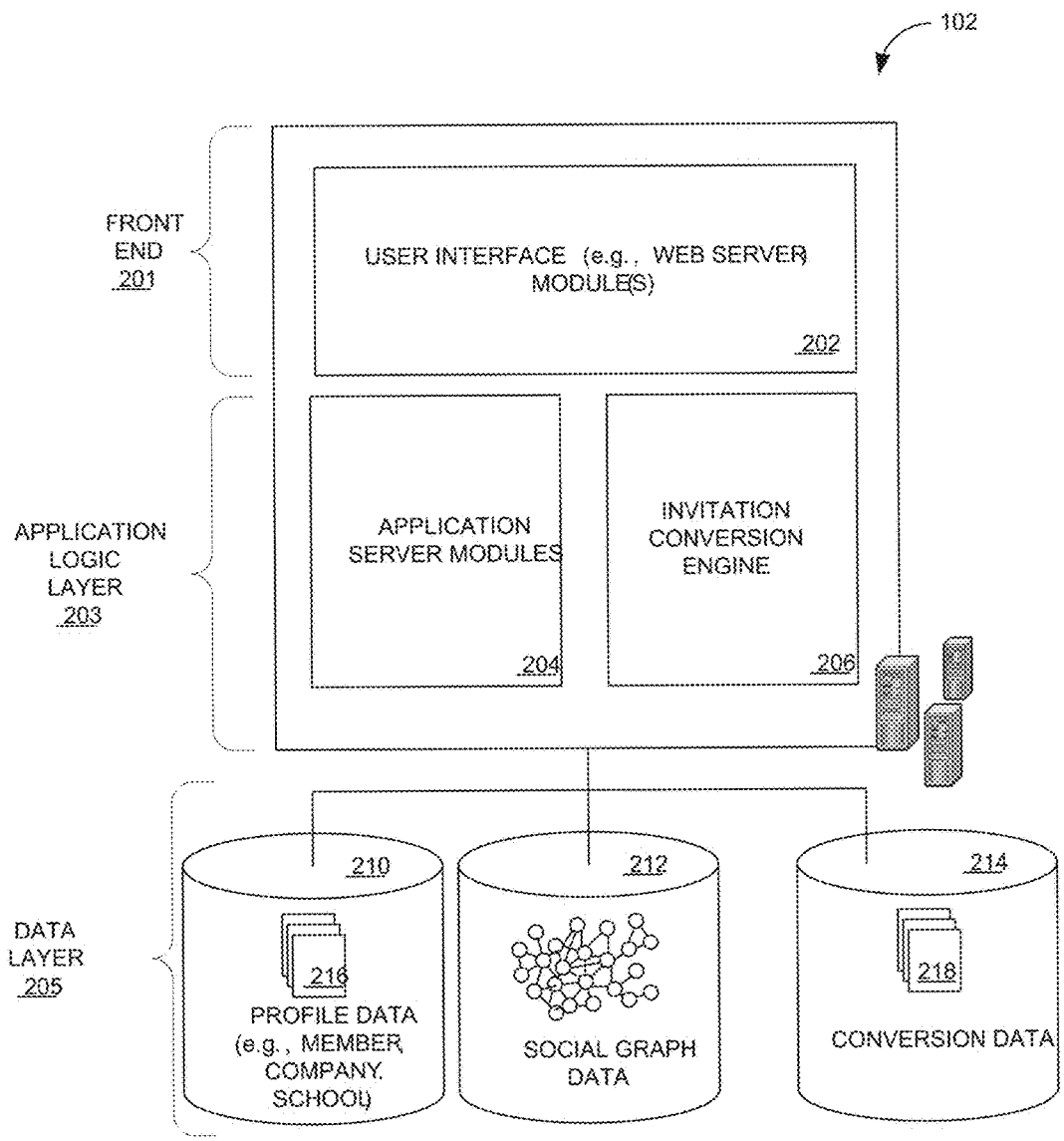
FIG. 2 is a block diagram showing functional components of a professional social network within a networked system, in accordance with an example embodiment.

FIG. 2 is a block diagram showing functional components of a professional social network within the networked system 102, in accordance with an example embodiment.

As shown in FIG. 2, the professional social network (or social network service) may be based on a three-tiered architecture, consisting of a front-end layer 201, an application logic layer 203, and a data layer 205. In some embodiments, the modules, systems, and/or engines shown in FIG. 2 represent a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 2. However, one skilled in the art will readily recognize that various additional functional modules and engines may be used with a professional social network, such as that illustrated in FIG. 2, to facilitate additional functionality that is not specifically described herein. Furthermore, the various functional modules and engines depicted in FIG. 2 may reside on a single server computer, or may be distributed across several server computers in various arrangements. Moreover, although a professional social network is depicted in FIG. 2 as a three-tiered architecture, the inventive subject matter is by no means limited to such architecture. It is contemplated that other types of architecture are within the scope of the present disclosure.

As shown in FIG. 2, in some embodiments, the front-end layer 201 comprises a user interface module (e.g., a web server) 202, which receives requests and inputs from various client-computing devices, and communicates appropriate responses to the requesting client devices. For example, the user interface module(s) 202 may receive requests in the form of Hypertext Transport Protocol (HTTP) requests, or other web-based, application programming interface (API) requests.

In some embodiments, the application logic layer 203 includes various application server modules 204, which, in conjunction with the user interface module(s) 202, generates various user interfaces (e.g., web pages) with data retrieved from various data sources in the data layer 205. In some embodiments, individual application server modules 204 are used to implement the functionality associated with various services and features of the professional social network. For instance, the ability of an organization to establish a presence in a social graph of the social network service, including the ability to establish a customized web page on behalf of an organization, and to publish messages or status updates on behalf of an organization, may be services implemented in independent application server modules 204. Similarly, a variety of other applications or services that are made available to members of the social network service may be embodied in their own application server modules 204.

As shown in FIG. 2, the data layer 205 may include several databases, such as a database 210 for storing profile data 216, including both member profile attribute data as well as profile attribute data for various organizations. Consistent with some embodiments, when a person initially registers to become a member of the professional social network, the person will be prompted to provide some profile attribute data such as, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information may be stored, for example, in the database 210. Similarly, when a representative of an organization initially registers the organization with the professional social network the representative may be prompted to provide certain information about the organization. This information may be stored, for example, in the database 210, or another database (not shown). With some embodiments, the profile data 216 may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or a seniority level within a particular company. With some embodiments, importing or otherwise accessing data from one or more externally hosted data sources may enhance profile data 216 for both members and organizations. For instance, with companies in particular, financial data may be imported from one or more external data sources, and made part of a company's profile.

The profile data 216 may also include information regarding settings for members of the professional social network. These settings may comprise various categories, including, but not limited to, privacy and communications. Each category may have its own set of settings that a member may control.

Once registered, a member may invite other members, or be invited by other members, to connect via the professional social network. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, may be stored and maintained as social graph data within a social graph database 212.

The professional social network may provide a broad range of other applications and services that allow members the opportunity to share and receive information, often customized to the interests of the member. For example, with some embodiments, the professional social network may include a photo sharing application that allows members to upload and share photos with other members. With some embodiments, members may be able to self-organize into groups, or interest groups, organized around a subject matter or topic of interest. With some embodiments, the professional social network may host various job listings providing details of job openings with various organizations.

In some embodiments, the professional social network provides an application programming interface (API) module via which third-party applications can access various services and data provided by the professional social network. For example, using an API, a third-party application may provide a user interface and logic that enables an authorized representative of an organization to publish messages from a third-party application to a content hosting platform of the professional social network that facilitates presentation of activity or content streams maintained and presented by the professional social network. Such third-party applications may be browser-based applications, or may be operating system-specific. In particular, some third-party applications may reside and execute on one or more mobile devices (e.g., a smartphone, or tablet computing devices) having a mobile operating system.

The data in the data layer 205 may be accessed, used, and adjusted by the Invitation Conversion Engine 206 as will be described in more detail below in conjunction with FIGS. 3-8. The data layer 205 further includes conversion data database 214. One or data portions 218 in conversion data database 214 comprise any of the following: one or more member identifiers, one or more external identifiers, one or more received acceptances, one or more listings of social network invitations and one or more listings of social network connection requests.

Although the Invitation Conversion Engine 206 is referred to herein as being used in the context of a professional social network or social network service, it is contemplated that it may also be employed in the context of any website or online services, including, but not limited to, content sharing sites (e.g., photo- or video-sharing sites) and any other online services that allow users to have a profile and present themselves or content to other users. Additionally, although features of the present disclosure are referred to herein as being used or presented in the context of a web page, it is contemplated that any user interface view (e.g., a user interface on a mobile device or on desktop software) is within the scope of the present disclosure.

Figure 3:
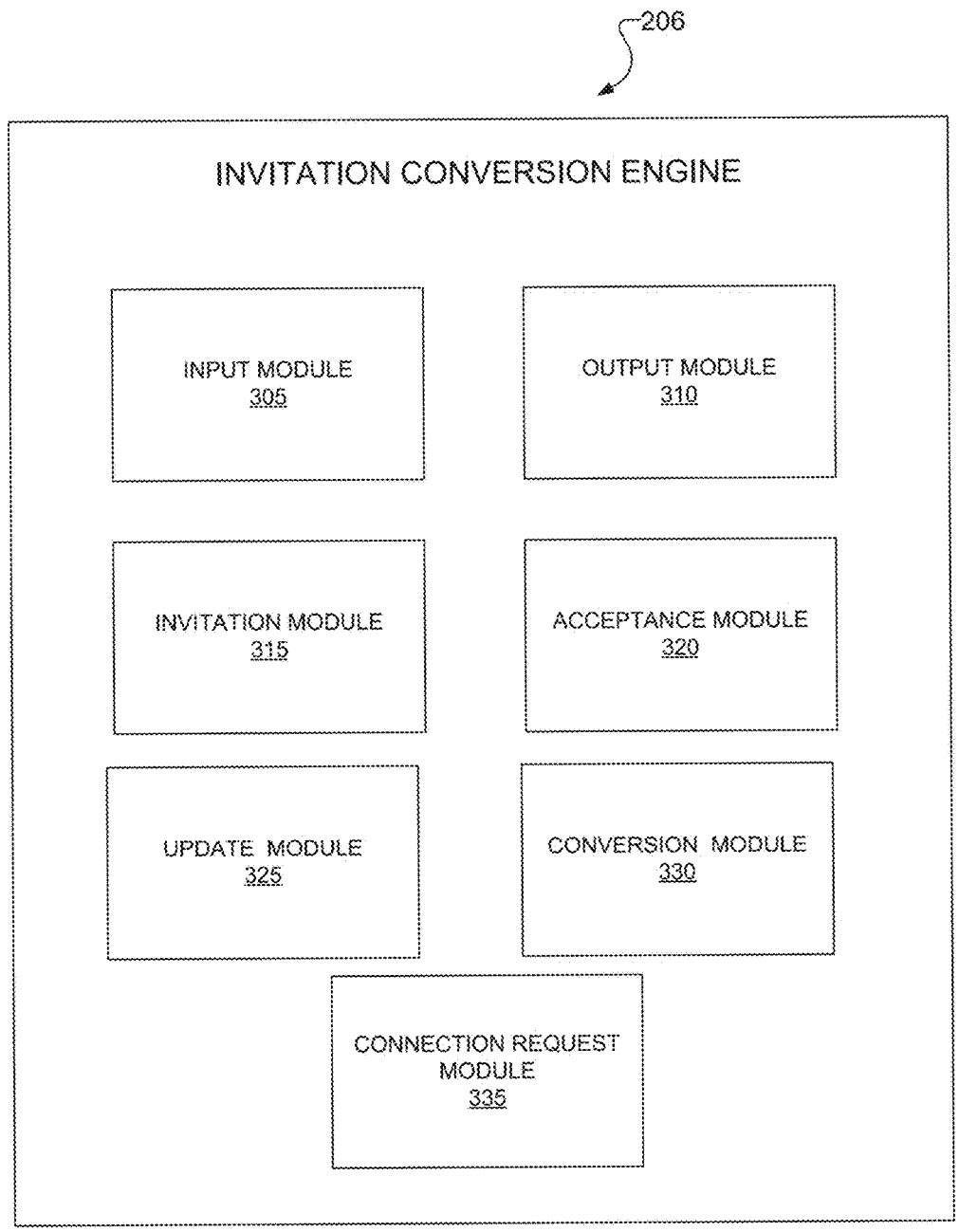
FIG. 3 is a block diagram showing example components of a Invitation Conversion Engine, according to some embodiments.

FIG. 3 is a block diagram showing example components of an Invitation Conversion Engine 206 according to some embodiments.

The input module 305 is a hardware-implemented module that controls, manages and stores information related to any inputs from one or more components of system 102 as illustrated in FIG. 1 and FIG. 2. In various embodiments, the inputs include a selection of a profile update functionality by a target member account. In various embodiments, an input also includes a selection of a profile attribute for a profile of any member account in the social network.

The output module 310 is a hardware-implemented module that controls, manages and stores information related to which sends any outputs to one or more components of system 100 of FIG. 1 (e.g., one or more client devices 110, 112, third party server 130, etc.). In some embodiments, the output is a prompt sent for a display on a client device that corresponds with a target member account.

The invitation module 315 is a hardware implemented module which manages, controls, stores, and accesses information related to generating social network invitations from one or more member accounts to be sent to various external identifiers that correspond with a particular individual. The external identifier are external to a social network service to which the member accounts belong. The invitation module 315 further tracks and stores the sent social network invitations and maps the social network invitations to a member identifier that is associated with all external identifiers that correspond with the particular individual.

The acceptance module 320 is a hardware-implemented module which manages, controls, stores, and accesses information related to receiving an acceptance of a social network invitation. The acceptance module 320 determines the external identifier for the particular individual from which the acceptance was sent. The acceptance module 320 accesses previously sent—but unaccepted—social network invitations mapped to the determined external identifier associated with the member identifier. Based on the receipt of the acceptance, the acceptance module 320 initializes a new member account for the particular individual.

The update module 325 is a hardware-implemented module which manages, controls, stores, and accesses information related to detecting an update to member account profile data. The update module 325 detects that profile data of the new member account for the particular individual has been updated according to a given external identifier. The update module 320 accesses previously sent—but unaccepted—social network invitations mapped to the given external identifier associated with the member identifier.

The conversion module 330 is a hardware-implemented module which manages, controls, stores, and accesses information related to converting social network invitations to respective social network connection requests. The conversion module 330 converts the social network invitations accessed by the acceptance module 320 and the update module 325 to social network connection requests. Each social network connection request corresponds to a member account that previously sent a social network invitation that was never accepted.

Figure 4:
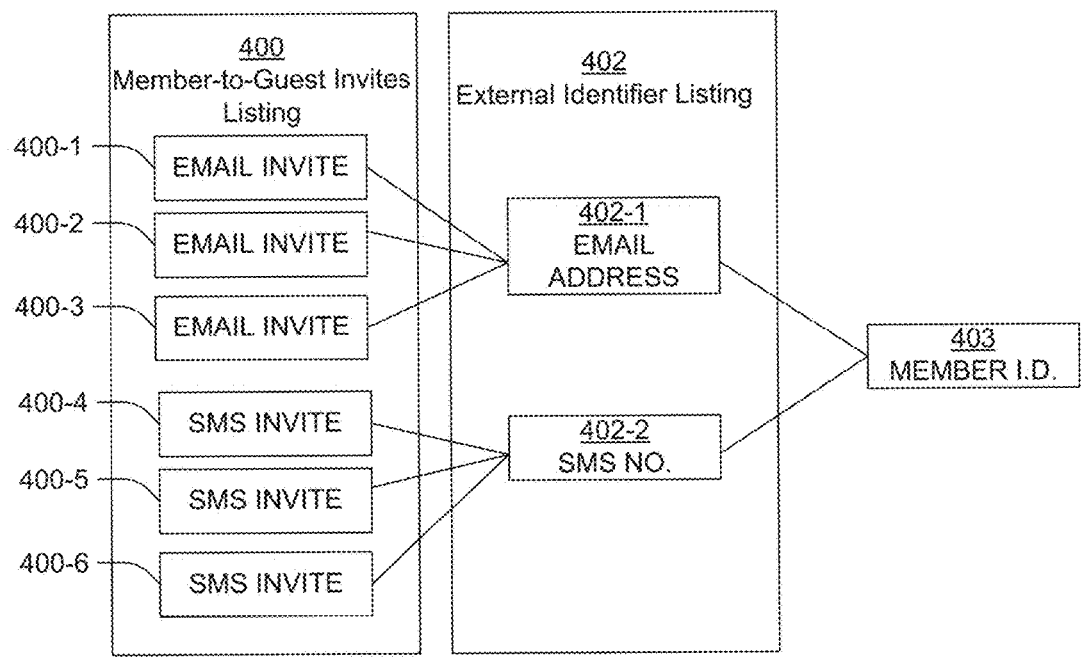
FIG. 4 is a block diagram showing example listing of social network invitations mapped to a member identifier, according to some embodiments.

The connection request module 335 is a hardware-implemented module which manages, controls, stores, and accesses information related to sending social network connection requests to the new member account. Upon initialization of the new member account, or upon detecting of profile data update, the connection request module 335 sends the social network connection requests generated by the conversion module 330 to the new member account FIG. 4 is a block diagram showing example listing of social network invitations mapped to a member identifier, according to some embodiments.

Each member account from a plurality of member accounts sends a social network invitation to the same individual. The Invitation Conversion Engine 206 generates a social network invitation 400-1, 400-2, 400-3, 400-4, 400-5, 400-6 to be sent from each respective member account to an external identifier 402-1, 402-2 that is associated with the individual. Each social network invitation 400-1 . . . 400-6 is a message providing the individual with a functionality to initiate registration with the social network service and to create a new member account for the individual.

The Invitation Conversion Engine 206 stores each invitation 400-1 . . . 400-6 in a listing 400 and each external identifier in a listing 402 as well. It is understood that a first external identifier 402-1 can be an email address associated with the individual and a second external identifier 402-2 can be Short Message Service (SMS) number 402-2 associated with the individual. A first subset of the social network invitations 400-1, 400-2, 400-3 are sent to the first external identifier 402-1 and a second subset of the social network invitations 400-4, 400-5, 400-6 are sent to the second external identifier 402-2.

The Invitation Conversion Engine 206 generates a member identifier 403 that is mapped to the external identifiers 402-1, 402-2. Therefore, each social network invitation 400-1 . . . 400-6 is mapped to the member identifier 403 via the particular external identifier 402-1, 402-2 to which it was sent.

Figure 5:
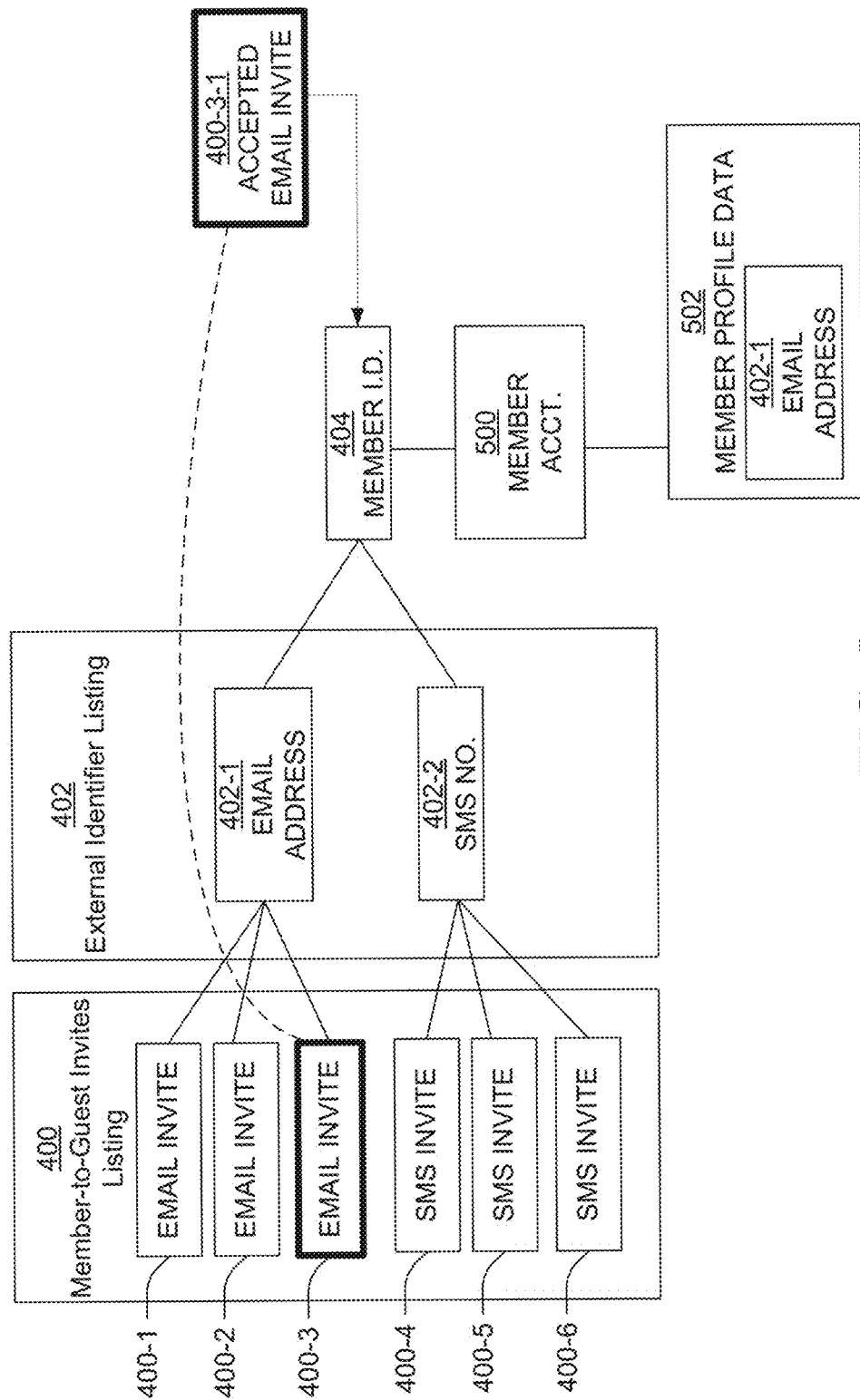
FIG. 5 is a block diagram showing a member account initialized based on acceptance of a social network invitation, according to some embodiments.

FIG. 5 is a block diagram showing a member account initialized based on acceptance of a social network invitation, according to some embodiments.

The Invitation Conversion Engine 206 receives an acceptance 400-3-1 of a particular social network invitation 400-3 that was sent to the first external identifier 400-3. Based on receipt of the acceptance 400-3-1, the Invitation Conversion Engine 206 instantiates and initializes a member account 500 associated with the first external identifier 400-3 and the member identifier 404. Since the particular social network invitation 400-3 was sent to the first external identifier 402-1, the Invitation Conversion Engine 206 inserts the first external identifier 402-1 into profile data 502 of the member account 500.

Figure 6:
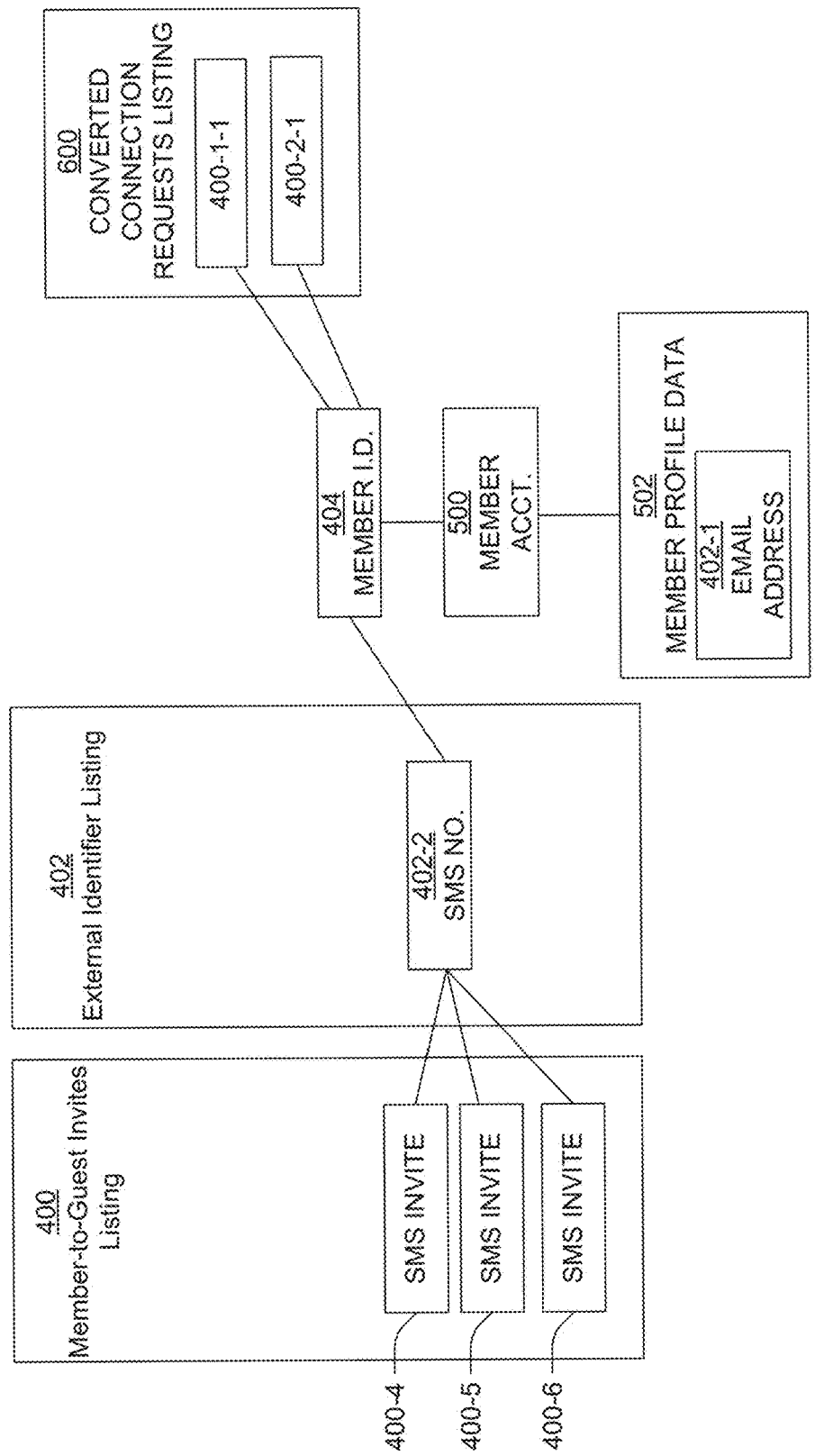
FIG. 6 is a block diagram showing conversion of social network invitations to social network connection requests based on an accepted social network invitation, according to some embodiments.

FIG. 6 is a block diagram showing conversion of social network invitations to social network connection requests based on an accepted social network invitation, according to some embodiments.

The Invitation Conversion Engine 206 accesses each remaining social network invitations 400-1, 400-2 sent to the first external identifier 402-1 but not accepted. The Invitation Conversion Engine 206 converts the social network invitations 400-1, 400-2 to respective social network connection requests 400-1-1, 400-2-1 and stored in a connection requests listing 600. The Invitation Conversion Engine 206 sends the social network connection requests 400-1-1, 400-2-1 to the member account 500 from the respective member accounts that sent the social network invitations 400-1, 400-2.

Figure 7:
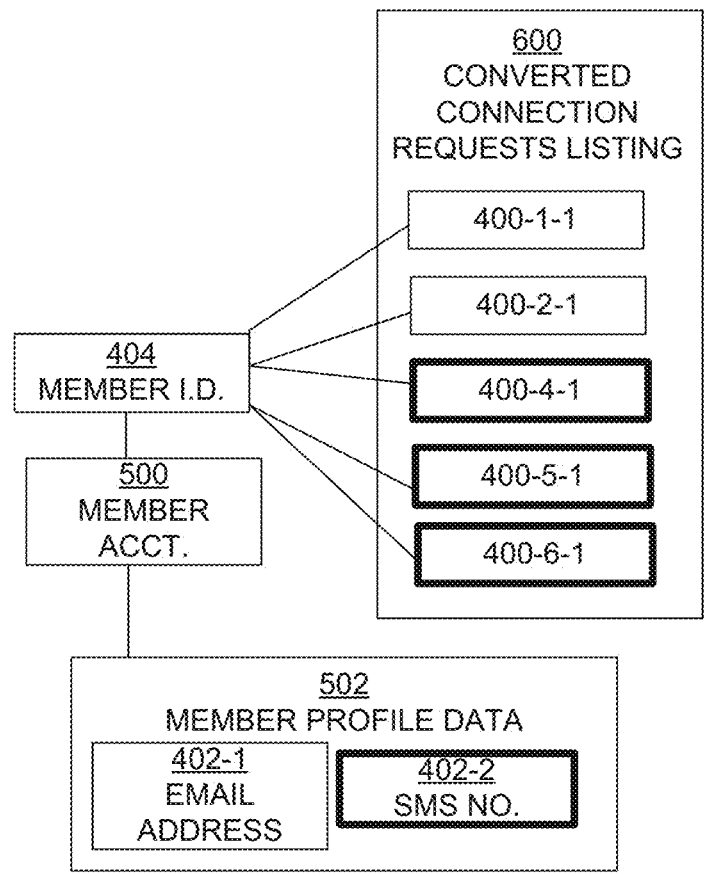
FIG. 7 is a block diagram showing conversion of social network invitations to social network connection requests based on an update to member account profile data, according to some embodiments.

FIG. 7 is a block diagram showing conversion of social network invitations to social network connection requests based on an update to member account profile data, according to some embodiments.

The Invitation Conversion Engine 206 receives the second external identifier 402-2 at a portion of the member account 500. That is, the member account 500 is updated to include an SMS number in the member profile data 502. The member account 500 and the member profile data 502 are associated with the member identifier 404 of the new member account 500. Based on detecting the second external identifier 402-2 at the portion of the member account 500, the Invitation Conversion Engine 206 accesses the social network invitations 400-4, 400-5, 400-6 previously sent from respective member accounts to the second external identifier 402-2—but were never accepted. The Invitation Conversion Engine 206 replaces the social network invitations 400-4, 400-5, 400-6 with corresponding social network connection requests 400-4-1, 400-5-1, 400-6-1. The Invitation Conversion Engine 206 sends the social network connection requests 400-4-1, 400-5-1, 400-6-1 to the member account 500 from those respective member accounts that previously sent the social network invitations 400-4, 400-5, 400-6

Figure 8:
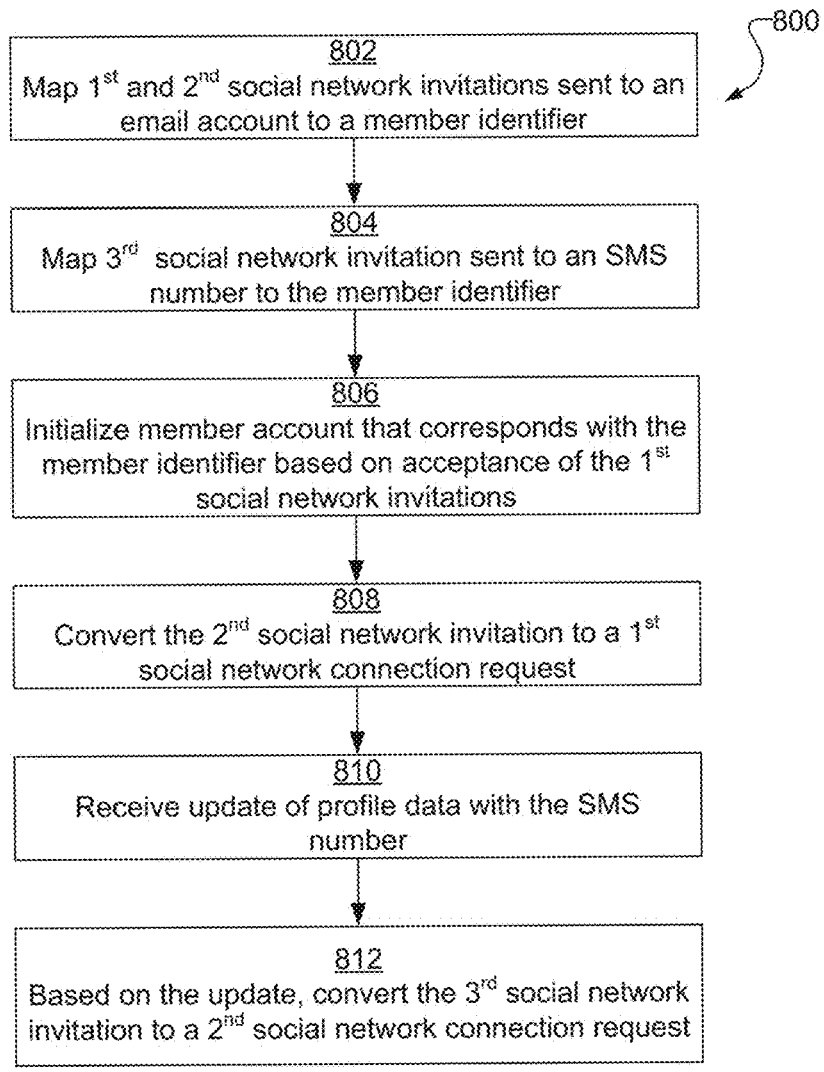
FIG. 8 is a flowchart illustrating a method for converting social network invitations to social network connection requests, according to some embodiments.

FIG. 8 is a flowchart 800 illustrated a method for converting social network invitations to social network connection requests, according to some embodiments.

In operation 802, the Invitation Conversion Engine 206 maps $1^{st}$ and $2^{nd}$ social network invitations sent to an email account to a member identifier. Respective member accounts of a social network service send the $1^{st}$ and $2^{nd}$ social network invitations send to an email account that is external to the social network service. The email account is associated with an individual that can potentially register a new member account with the social network service. The Invitation Conversion Engine 206 initializes a member identifier and the $1^{st}$ and $2^{nd}$ social network invitations are mapped to the member identifier.

In operation 804, the Invitation Conversion Engine 206 maps $3^{rd}$ social network invitation sent to an SMS number to the member identifier. Another member account of the social network service sends the $3^{rd}$ social network invitations sent to an SMS number. The SMS is associated with that same individual that corresponds with the email account. The Invitation Conversion Engine 206 maps the $3^{rd}$ social network invitation to the member identifier.

In operation 806, the Invitation Conversion Engine 206 initializes member account that corresponds with the member identifier based on acceptance of the $1^{st}$ social network invitation. The Invitation Conversion Engine 206 receives an acceptance notification of the $1^{st}$ social network invitation from the email account. As such, the $2^{nd}$ social network invitation will not be accepted since the acceptance of the $1^{st}$ social network invitation triggers registration of the new member account for the individual that correspond with the email account. The Invitation Conversion Engine 206 inserts the email account into profile data of the member account.

In operation 808, the Invitation Conversion Engine 206 converts the $2^{nd}$ social network invitation to a $1^{st}$ social network connection request. The Invitation Conversion Engine 206 accesses the $2^{nd}$ social network invitation via the mapping between the member identifier of the new member account and the $2^{nd}$ social network invitation. Since the $2^{nd}$ social network invitation will not be accepted, the Invitation Conversion Engine 206 converts the $2^{nd}$ social network invitation to a $1^{st}$ social network connection request sent from a member account that previously sent the $2^{nd}$ social network invitation. The Invitation Conversion Engine 206 sends the $1^{st}$ social network connection request to the new member account.

In operation 810, the Invitation Conversion Engine 206 receives update of profile data with the SMS number. The Invitation Conversion Engine 206 detects that the new member account has been updated to include the SMS number in the profile data of the new member account. The Invitation Conversion Engine 206 accesses the $3^{rd}$ social network invitation via the mapping between the member identifier of the new member account and the $3^{rd}$ social network invitation.

In operation 812, the Invitation Conversion Engine 206, based on the update, converts the $3^{rd}$ social network invitation to a $2^{nd}$ social network connection request. Since the $3^{rd}$ social network invitation will not be accepted, the Invitation Conversion Engine 206 converts the $3^{rd}$ social network invitation to a $2^{nd}$ social network connection request sent from a member account that previously sent the $3^{rd}$ social network invitation. The Invitation Conversion Engine 206 sends the $2^{nd}$ social network connection request to the new member account.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 9:
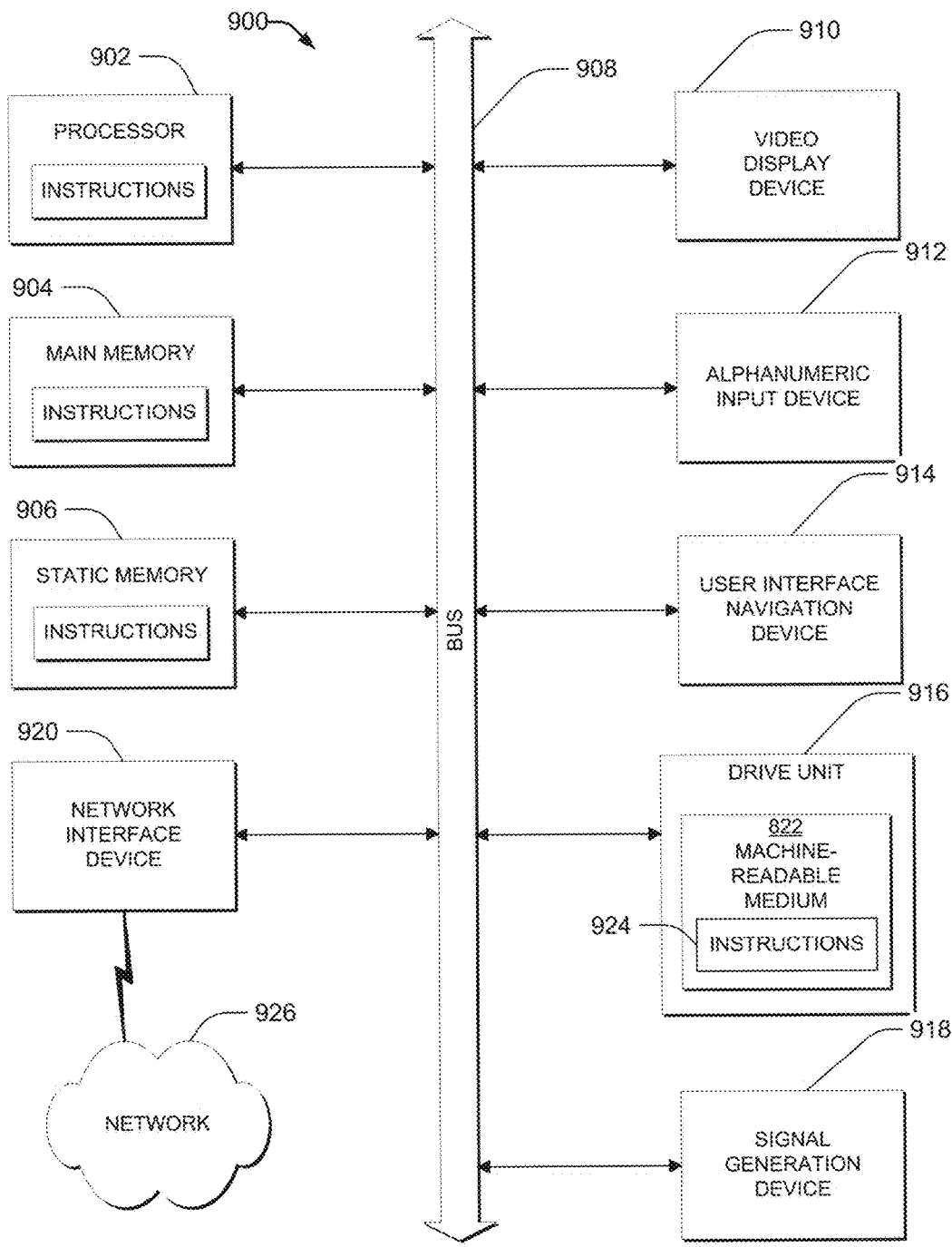
FIG. 9 is a block diagram of an example computer system on which methodologies described herein may be executed, in accordance with an example embodiment.

FIG. 9 is a block diagram of a machine in the example form of a computer system 900 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 900 includes a processor 902 (e.g., a central processing unit (CPU), a graphics processing unit (GPU) or both), a main memory 904, and a static memory 906, which communicate with each other via a bus 908. Computer system 900 may further include a video display device 910 (e.g., a liquid crystal display (LCD) or a cathode ray tube (CRT)). Computer system 900 also includes an alphanumeric input device 912 (e.g., a keyboard), a user interface (UI) navigation device 914 (e.g., a mouse or touch sensitive display), a disk drive unit 916, a signal generation device 918 (e.g., a speaker) and a network interface device 920.

Disk drive unit 916 includes a machine-readable medium 922 on which is stored one or more sets of instructions and data structures (e.g., software) 924 embodying or utilized by any one or more of the methodologies or functions described herein. Instructions 924 may also reside, completely or at least partially, within main memory 904, within static memory 906, and/or within processor 902 during execution thereof by computer system 900, main memory 904 and processor 902 also constituting machine-readable media.

While machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present technology, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Instructions 924 may further be transmitted or received over a communications network 926 using a transmission medium. Instructions 924 may be transmitted using network interface device 920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the technology. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer system, comprising:
    a processor;
    a memory device holding an instruction set executable on the processor to cause the computer system to perform operations comprising:
    generating a first social network invitation for transmission to a first external identifier of a potential member account from a first member account of a social network service;
    generating a second social network invitation for transmission to the first external identifier of the potential member account from a second member account of the social network service;
    based on receipt of an acceptance of the second social network invitation:
        instantiating a new member account associated with the first external identifier via a member identifier;
        converting the first social network invitation to a first social network connection request from the first member account for the new member account; and
        providing the first social network connection request to the new member account.

2. The computer system of claim 1, further comprising:
    prior to receipt of the acceptance of the second social network invitation:
        generating a third social network invitation for transmission to a second external identifier of the potential member account from a third member account of the social network service.

3. The computer system of claim 2, further comprising:
    based on receipt of the acceptance of the second social network invitation and receipt of member account data for the new member account that matches the second external identifier:
        converting the third social network invitation to a second social network connection request from the third member account for the new member account; and
        providing the second social network connection request to the new member account.

4. The computer system of claim 3, further comprising:
    generating the member identifier for the potential member account
    mapping the first and the second social network invitations to the member identifier; and
    wherein converting the first social network invitation to a first social network connection request comprises:
        determining the acceptance of the second social network invitation corresponds with the member identifier;
        assigning the member identifier to the new member account;
        accessing the first social network invitation according to the member identifier; and
        replacing the first social network invitation with the first social network connection request.

5. The computer system of claim 4, wherein assigning the member identifier to the new member account comprises:
    based on the accepted second social network invitation having been transmitted to the first external identifier, inserting the first external identifier into a portion of the member account data associated with the member identifier of the new member account.

6. The computer system of claim 5, further comprises:
    mapping the third social network invitation to the member identifier;
    receiving the second external identifier at a portion of the member account data associated with the member identifier of the new member account;
    wherein converting the third social network invitation to a second social network connection request comprises:
        accessing the third social network invitation according to the member identifier; and
        replacing the third social network invitation with the second social network connection request.

7. The computer system of claim 6, wherein the first external identifier comprises an electronic message account external to the social network service and the second external identifier comprises a Short Message Service (SMS) number.

8. The computer system of claim 6, wherein the first external identifier comprises a Short Message Service (SMS) number and the second external identifier comprises an electronic message account external to the social network service.

9. A computer-implemented method comprising:
    generating a first social network invitation for transmission to a first external identifier of a potential member account from a first member account of a social network service;

generating a second social network invitation for transmission to the first external identifier of the potential member account from a second member account of the social network service;

based on receipt of an acceptance of the second social network invitation:
   instantiating, via at least one hardware processor, a new member account associated with the first external identifier via a member identifier;
   converting the first social network invitation to a first social network connection request from the first member account for the new member account; and
   providing the first social network connection request to the new member account.

10. The computer-implemented method of claim 9, further comprising:
prior to receipt of the acceptance of the second social network invitation:
   generating a third social network invitation for transmission to a second external identifier of the potential member account from a third member account of the social network service.

11. The computer-implemented method of claim 10, further comprising:
based on receipt of the acceptance of the second social network invitation and receipt of member account data for the new member account that matches the second external identifier:
   converting the third social network invitation to a second social network connection request from the third member account for the new member account; and
   providing the second social network connection request to the new member account.

12. The computer-implemented method of claim 11, further comprising:
generating the member identifier for the potential member account
mapping the first and the second social network invitations to the member identifier; and
wherein converting the first social network invitation to a first social network connection request comprises:
   determining the acceptance of the second social network invitation corresponds with the member identifier;
   assigning the member identifier to the new member account;
   accessing the first social network invitation according to the member identifier; and
   replacing the first social network invitation with the first social network connection request.

13. The computer-implemented method of claim 12, wherein assigning the member identifier to the new member account comprises:
based on the accepted second social network invitation having been transmitted to the first external identifier, inserting the first external identifier into a portion of the member account data associated with the member identifier of the new member account.

14. The computer-implemented method of claim 13, further comprises:
mapping the third social network invitation to the member identifier;
receiving the second external identifier at a portion of the member account data associated with the member identifier of the new member account;

wherein converting the third social network invitation to a second social network connection request comprises:
   accessing the third social network invitation according to the member identifier; and
   replacing the third social network invitation with the second social network connection request.

15. The computer-implemented method of claim 14, wherein the first external identifier comprises an electronic message account external to the social network service and the second external identifier comprises a Short Message Service (SMS) number.

16. The computer-implemented method of claim 14, wherein the first external identifier comprises a Short Message Service (SMS) number and the second external identifier comprises an electronic message account external to the social network service.

17. A non-transitory computer-readable medium storing executable instructions thereon, which, when executed by a processor, cause the processor to perform operations including:
generating a first social network invitation for transmission to a first external identifier of a potential member account from a first member account of a social network service;
generating a second social network invitation for transmission to the first external identifier of the potential member account from a second member account of the social network service;
based on receipt of an acceptance of the second social network invitation:
   instantiating a new member account associated with the first external identifier via a member identifier;
   converting the first social network invitation to a first social network connection request from the first member account for the new member account; and
   providing the first social network connection request to the new member account.

18. The non-transitory computer-readable medium of claim 17, further comprising:
prior to receipt of the acceptance of the second social network invitation:
   generating a third social network invitation for transmission to a second external identifier of the potential member account from a third member account of the social network service.

19. The non-transitory computer-readable medium of claim 18, further comprising:
based on receipt of the acceptance of the second social network invitation and receipt of member account data for the new member account that matches the second external identifier:
   converting the third social network invitation to a second social network connection request from the third member account for the new member account; and
   providing the second social network connection request to the new member account.

20. The non-transitory computer-readable medium of claim 19, further comprising:
generating the member identifier for the potential member account mapping the first and the second social network invitations to the member identifier; and
wherein converting the first social network invitation to a first social network connection request comprises:
   determining the acceptance of the second social network invitation corresponds with the member identifier;

assigning the member identifier to the new member account,
accessing the first social network invitation according to the member identifier; and
replacing the first social network invitation with the first social network connection request.

\* \* \* \* \*

UNITED STATES PATENT AND TRADEMARK OFFICE
CERTIFICATE OF CORRECTION

PATENT NO. : 10,313,294 B2
APPLICATION NO. : 15/334581
DATED : June 4, 2019
INVENTOR(S) : Maczka et al.

Page 1 of 1

It is certified that error appears in the above-identified patent and that said Letters Patent is hereby corrected as shown below:

In the Claims

In Column 14, Line 20, in Claim 4, after "account", insert --;--

In Column 15, Line 39, in Claim 12, after "account", insert --;--

In Column 16, Line 61, in Claim 20, after "account", insert --;--

In Column 16, Line 61, in Claim 20, before "mapping", insert --¶--

In Column 17, Line 2, in Claim 20, delete "account," and insert --account;-- therefor Signed and Sealed this
Fourteenth Day of April, 2020

Andrei Iancu
*Director of the United States Patent and Trademark Office*